US008047605B2

(12) United States Patent
Yamazaki et al.

(10) Patent No.: US 8,047,605 B2
(45) Date of Patent: Nov. 1, 2011

(54) FRAME STRUCTURE OF THE VEHICLE SEAT

(75) Inventors: Akira Yamazaki, Nagoya (JP); Kenji Kato, Toki (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 361 days.

(21) Appl. No.: 12/353,308

(22) Filed: Jan. 14, 2009

(65) Prior Publication Data

US 2009/0179477 A1    Jul. 16, 2009

(30) Foreign Application Priority Data

Jan. 16, 2008    (JP) ................................. 2008-006802

(51) Int. Cl.
*B60N 2/42* (2006.01)
(52) U.S. Cl. ................. 297/216.1; 297/452.18
(58) Field of Classification Search ............... 297/216.1, 297/216.13, 216.14, 452.18
See application file for complete search history.

(56) References Cited

U.S. PATENT DOCUMENTS

| 3,669,397 | A | * | 6/1972 | Le Mire ........................ 248/371 |
| 4,413,840 | A | * | 11/1983 | Shah .............................. 280/784 |
| 4,673,215 | A | * | 6/1987 | Yokoyama ................. 297/452.18 |
| 4,702,515 | A | * | 10/1987 | Kato et al. ................. 296/187.01 |
| 5,431,445 | A |   | 7/1995 | Wheatley |
| 5,772,245 | A |   | 6/1998 | Muhlhausen |
| 5,913,567 | A | * | 6/1999 | Novak et al. ............... 297/216.1 |
| 6,132,003 | A | * | 10/2000 | Sakurai et al. ............ 297/452.18 |
| 6,176,543 | B1 | * | 1/2001 | Nawata et al. ................ 296/68.1 |
| 6,220,669 | B1 | * | 4/2001 | Frohnhaus et al. ....... 297/452.18 |
| 6,880,663 | B2 |   | 4/2005 | Fujiki et al. |
| 7,389,860 | B2 | * | 6/2008 | Abu-Odeh et al. ............ 188/377 |
| 7,677,617 | B2 | * | 3/2010 | Stewart et al. ................. 293/133 |
| 7,748,507 | B2 | * | 7/2010 | Canot et al. .................... 188/377 |
| 7,810,881 | B2 | * | 10/2010 | Beneker et al. ............ 297/216.1 |
| 2003/0020306 | A1 | * | 1/2003 | Eckendorff ................ 297/216.1 |
| 2003/0075951 | A1 |   | 4/2003 | Hanakawa et al. |
| 2003/0102701 | A1 | * | 6/2003 | Pedronno et al. .......... 297/216.1 |
| 2004/0113481 | A1 | * | 6/2004 | Saberan et al. ........... 297/452.18 |
| 2009/0127913 | A1 | * | 5/2009 | Beneker et al. ........... 297/452.18 |
| 2009/0184562 | A1 | * | 7/2009 | Wilson et al. ............. 297/452.18 |
| 2010/0187893 | A1 | * | 7/2010 | Yamada et al. ........... 297/452.18 |
| 2010/0194170 | A1 | * | 8/2010 | Muhlenbrock ........... 297/452.18 |
| 2010/0320826 | A1 | * | 12/2010 | Wilson et al. ............. 297/452.18 |

FOREIGN PATENT DOCUMENTS

| FR | 2539971 A1 * | 8/1984 |
| JP | 2001-178584 A | 7/2001 |

OTHER PUBLICATIONS

English language Abstract of JP 2001-178584 A (Jul. 3, 2001).

* cited by examiner

*Primary Examiner* — David Dunn
*Assistant Examiner* — David E Allred
(74) *Attorney, Agent, or Firm* — Greenblum & Bernstein, P.L.C.

(57) ABSTRACT

One aspect of the present invention can include a vehicle seat, a seat frame having a cushion frame, the cushion frame with a first and second side frame, a bead extending from an outer side of one of the first and second side frame, the bead including a first and second inclined surface connected at a ridge portion, and a notch portion defined in a lower portion of the at least one of the first and second side frame, wherein the notch portion is positioned proximate the bead.

13 Claims, 4 Drawing Sheets

FRAME STRUCTURE OF THE VEHICLE SEAT

This application claims priority to Japanese patent application serial number 2008-006802, the contents of which are incorporated herein by reference.

BACKGROUND OF THE INVENTION

1. Field of the Invention

The present invention relates to a frame structure of a vehicle seat for absorbing an impact generated upon a rear-end collision by bending of a seat frame.

2. Description of the Related Art

A vehicle seat includes a seat-cushion, a seat-back and a reclining system. The reclining system connects the seat-back to the seat-cushion so as to be capable of moving between an upright position and a reclined position.

When the vehicle encounters the rear-end collision, an occupant seated on the vehicle seat is pressed toward the rear of the seat due to the impact thereof. The seat-back is positioned upright at a predetermined angle of inclination with the reclining system. The occupant must be supported by the seat-back. In order to do so, a configuration (frame structure) which causes another frame component to bend to absorb the impact of the rear-end collision is necessary to protect the reclining system.

A kind of a frame structure is described in JP-A-2001-178584. This structure includes a reclining system and a bracket. A cushion frame and a back frame are connected via the reclining system. The back frame is mounted on the reclining system via the bracket. The bracket includes a main plate shaped as a flat plate and a flange to be connected to the main plate. The flange has a substantially L-shape (side cross-sectional view).

The bracket includes a bead. The bead is a portion that is formed by depressing an outer wall of the bracket inwardly of the bracket in a triangle shape. The bead is formed on the bracket so as to extend across a borderline between the main plate and the flange.

The impact of the rear-end collision of the vehicle is absorbed by bending of the bracket (outer wall) starting from the bead. The impact which is transmitted to the reclining system is alleviated by the impact absorption as described above.

However, this frame structure does not include configurations to absorb impact other than bending of the bracket (part of the back frame) by plastic deformation. Therefore, sufficient alleviation of the impact of the rear-end collision is not achieved by the frame structure.

The vehicle seat is adapted to transmit the impact of the rear-end collision to the cushion frame which is joined to the back frame. Therefore, the impact of the rear-end collision can be sufficiently absorbed by bending the cushion frame. However, since the occupant is seated on the cushion frame, the cushion frame should not be bent in an arbitrary direction.

SUMMARY OF THE INVENTION

One aspect of the present invention can include a vehicle seat, a seat frame having a cushion frame, the cushion frame with a first and second side frame, a bead extending from an outer side of one of the first and second side frame, the bead including a first and second inclined surface connected at a ridge portion, and a notch portion defined in a lower portion of the at least one of the first and second side frame, wherein the notch portion is positioned proximate the bead.

DETAILED DESCRIPTION OF THE INVENTION

Each of the additional features and teachings disclosed above and below may be utilize separately or in conjunction with other features and teachings to provide a frame structure of a vehicle seat. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Hereafter, a description will be given, referring FIGS. 1 to 6, of a best mode for carrying out one aspect of the invention. In each figure, a reference letter F will be given to a front side of a vehicle seat, a reference letter B to a back side of a vehicle seat, reference letter I to a inside of a vehicle seat, and a reference letter L to a lateral side of a vehicle seat. In FIG. 6, the length of a notched portion is illustrated to be longer than the actual length for the sake of convenience.

Figure 1:
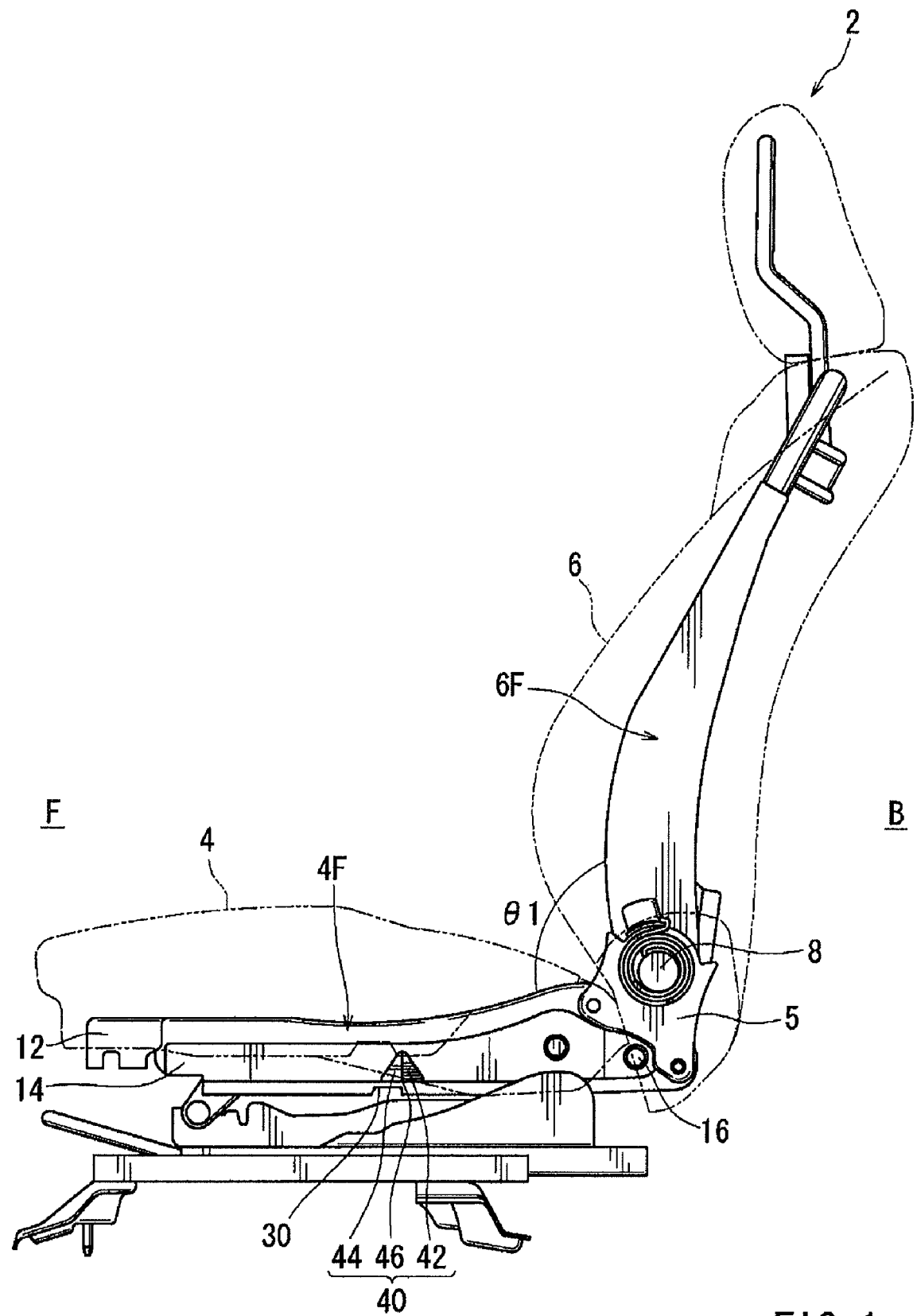
FIG. 1 is a side view of a frame of a vehicle seat.

Referring to FIG. 1, a vehicle seat 2 includes a cushion frame 4F (a frame of a seat-cushion 4), a back frame 6F (a frame of a seat-back 6), a bracket 5 and a reclining system 8. The bracket 5 is mounted on a lower portion of the back frame 6F. A rear portion of the cushion frame 4F is joined to the lower portion of the back frame 6F via the bracket 5.

The reclining system 8 is provided on the bracket 5. The reclining system 8 is a member for joining the back frame 6F to the cushion frame 4F so as to be capable of moving between the upright position and the reclined position. The reclining system 8 is also a member for controlling an angle of inclination θ1 of the back frame 6F with respect to the cushion frame 4F. Upon a rear-end collision of a vehicle, the reclining system 8 is needed to be protected from an impact of the rear-end collision and maintain the seat-back 6 at a predetermined angle of inclination θ1.

(Cushion Frame)

Figure 2:
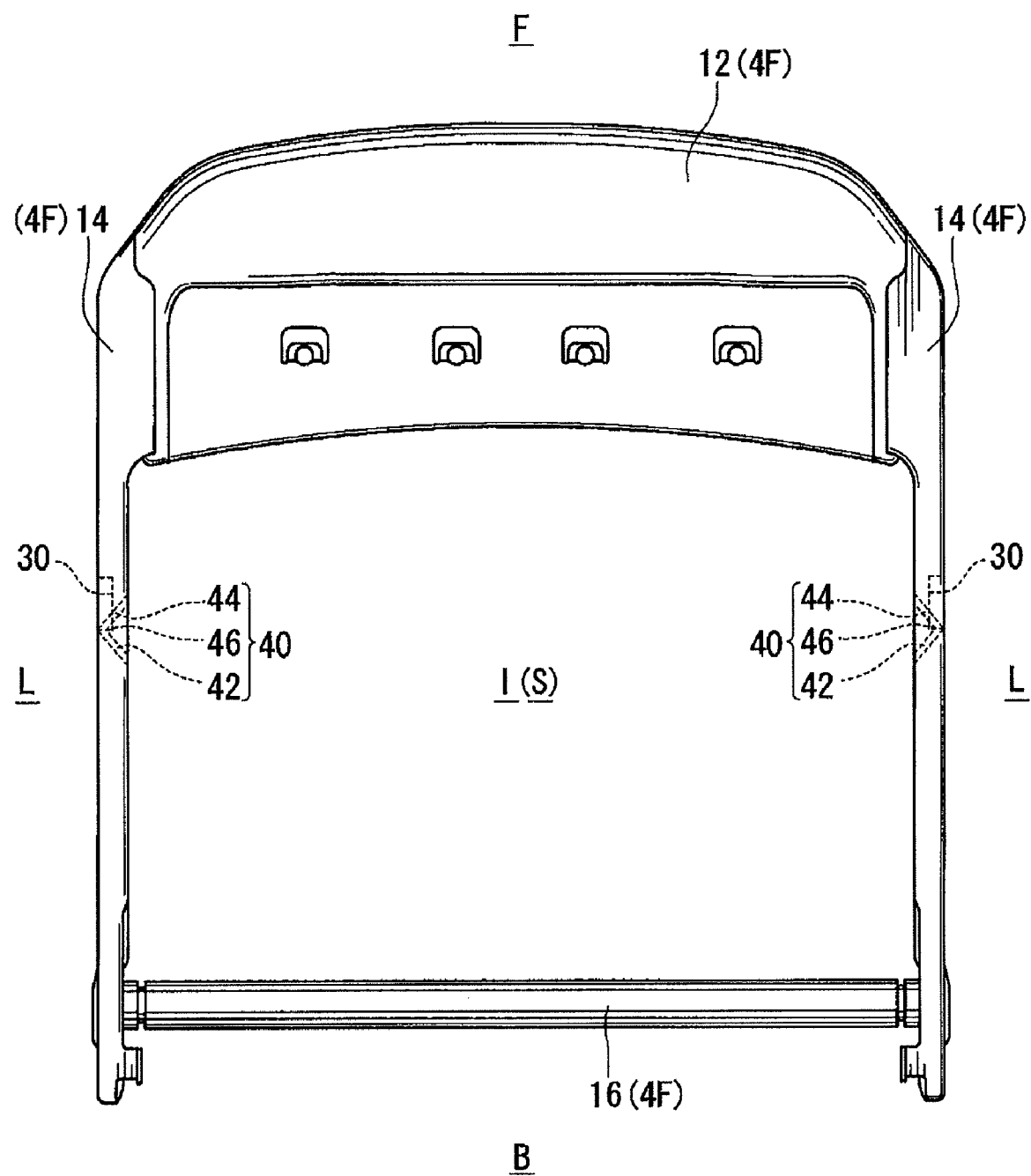
FIG. 2 is an upper front view of a cushion frame.

The cushion frame 4F includes a front frame 12, a pair of side frames 14, 14 and a pipe frame 16 (see FIG. 1 and FIG. 2). The front frame 12 is a front framework of the cushion frame 4F. The pair of side frames 14, 14 is side frameworks of the cushion frame 4F. The pipe frame 16 is disposed on the rear portions of the pair of side frames 14, 14 so as to be bridged therebetween. The pipe frame 16 is a member for reinforcing the pair of side frames 14, 14.

The pair of side frames 14, 14 (of a flat-plate shape) face to each other and is arranged on sides of a vehicle seat. A seating portion (S) for an occupant is formed between the pair of side frames 14, 14. The rear portions of the side frames 14, 14 are joined to the lower portion of the back frame 6F via the bracket 5.

Figure 3:
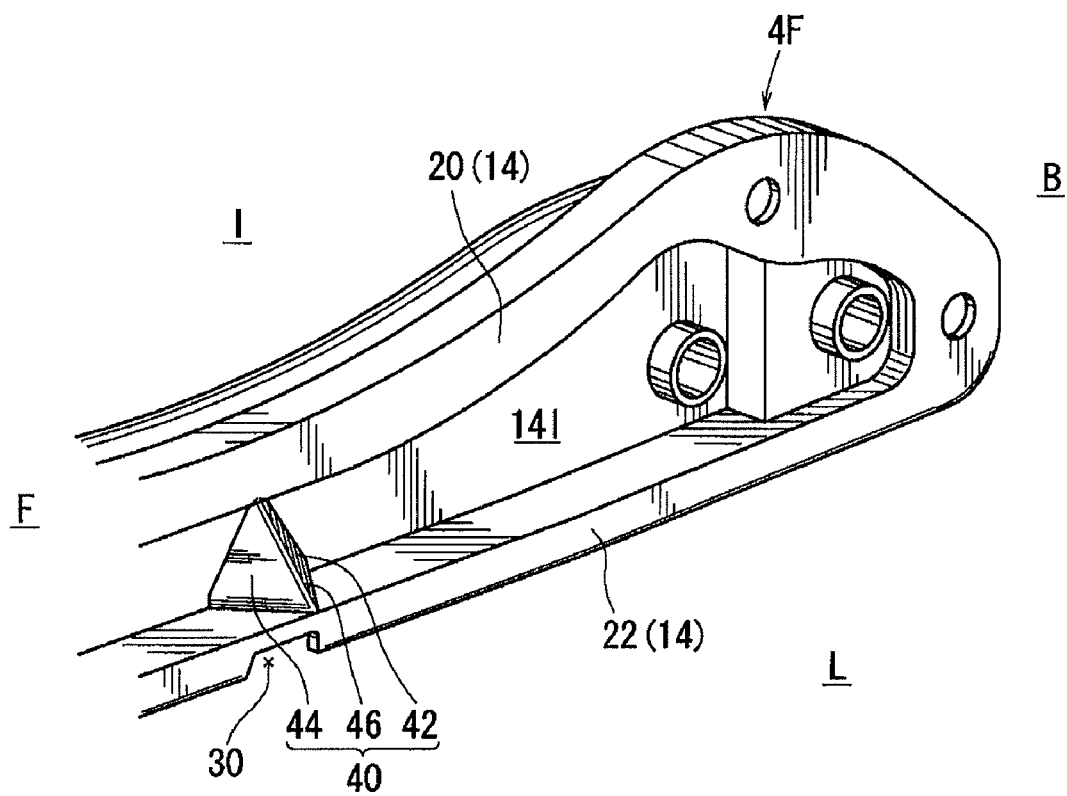
FIG. 3 is a perspective view of a part of the cushion frame.

Referring to FIG. 3, the upper edge of the side frame 14 protrudes sidewardly of the seat from a side surface 14I (an upper end flange 20 is formed). The lower edge of the side frame 14 protrudes sidewardly of the seat from the side surface 14I (an lower end flange 22 is formed).

A notched portion 30 and a triangle bead 40 are formed respectively on each of the pair of side frames 14, 14 as a configuration to bend the same.

(Notched Portion)

The notched portion 30 is a weakened portion of the side frame 14. The notched portion 30 is provided at a position on the front side of the side frames 14 (see FIG. 2). Referring to FIG. 3, the notched portion 30 is formed by notching part of the lower end flange 22 in the fore-and-aft direction of the seat. Specifically, the notched portion 30 is formed by notching the part of the lower end flange 22 into a substantially rectangular shape.

The notched portion 30 of the side frame 14 is thinner and weaker than other arbitrary positions of the side frame 14 (positions formed the lower end flange 22). The side frame 14 can be bent at the position where the notched portion 30 is formed relatively easily upon reception of the impact of the rear-end collision.

Figure 4:
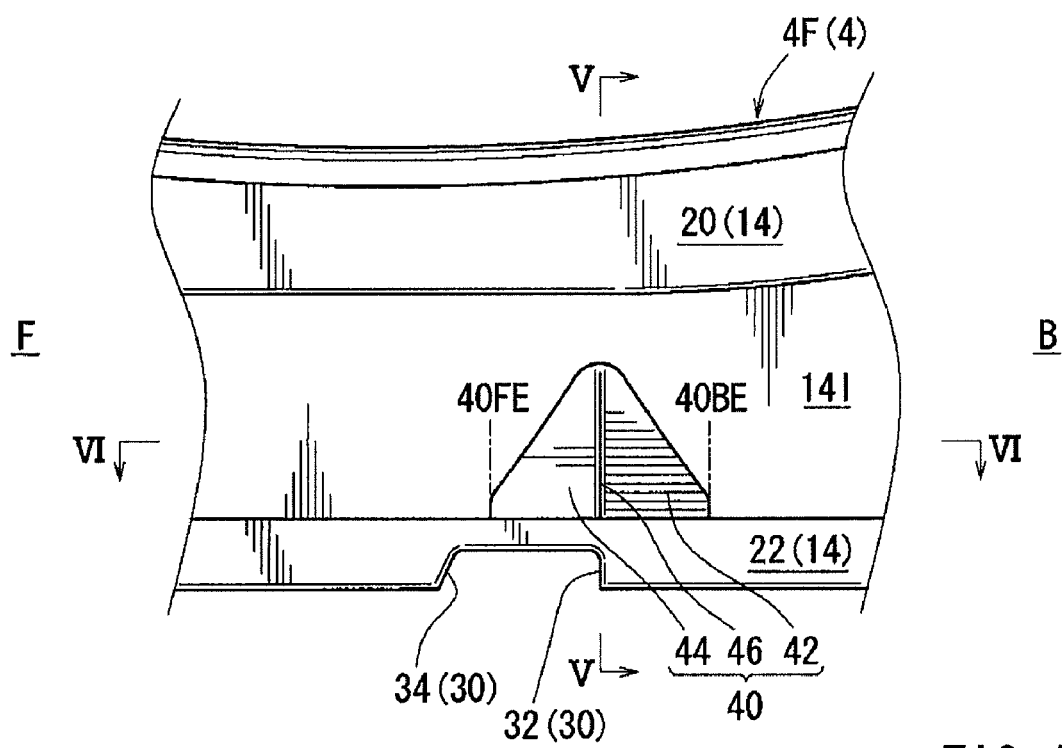
FIG. 4 is a side view of a part of the cushion frame.

A front end 34 and a rear end 32 of the notched portion 30 are formed by cutting out the side frame 14 from the lower end toward the upper end (see FIG. 4). The rear end 32 of the notched portion 30 is cut out substantially vertically from the lower end toward the upper end of the side frame 14. The rear end 32 is a portion where a stress of the impact is initially concentrated upon the rear-end collision. Therefore, the rear end 32 is weakest position of the side frame.

The front end 34 of the notched portion 30 is obliquely cut out from the lower end toward the upper end of the side frame 14. The impact of the rear-end collision is transmitted firstly to the rear end 32 of the notched portion 30, and then reaches the front end 34.

(Bead)

The triangle bead 40 is a starting point of the bending of the notched portion 30. The triangle bead 40 is provided on each of the pair of side frames 14, 14. Specifically, the triangle bead 40 is formed on the front side of the side frame 14 corresponding to the position where the notched portion 30 is formed (see FIG. 2).

Figure 5:
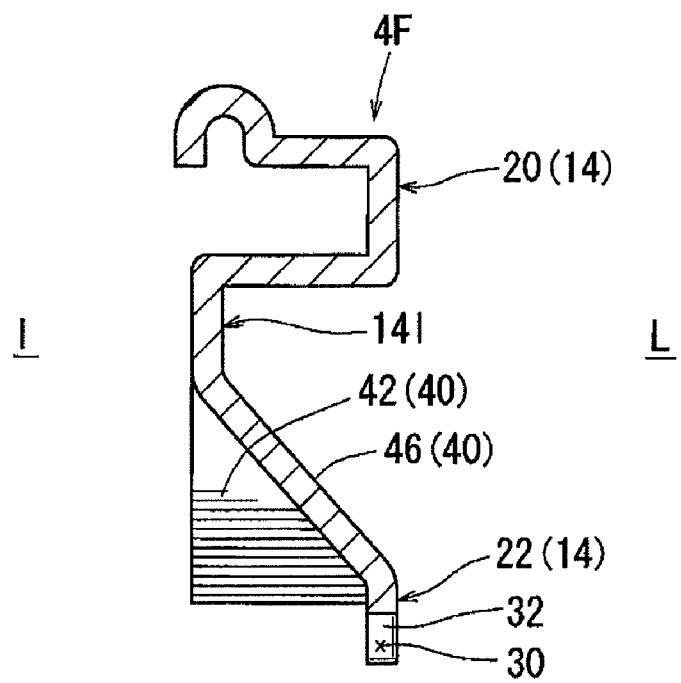
FIG. 5 is a vertical cross-sectional view taken along a line V-V in FIG. 4.
Figure 6:
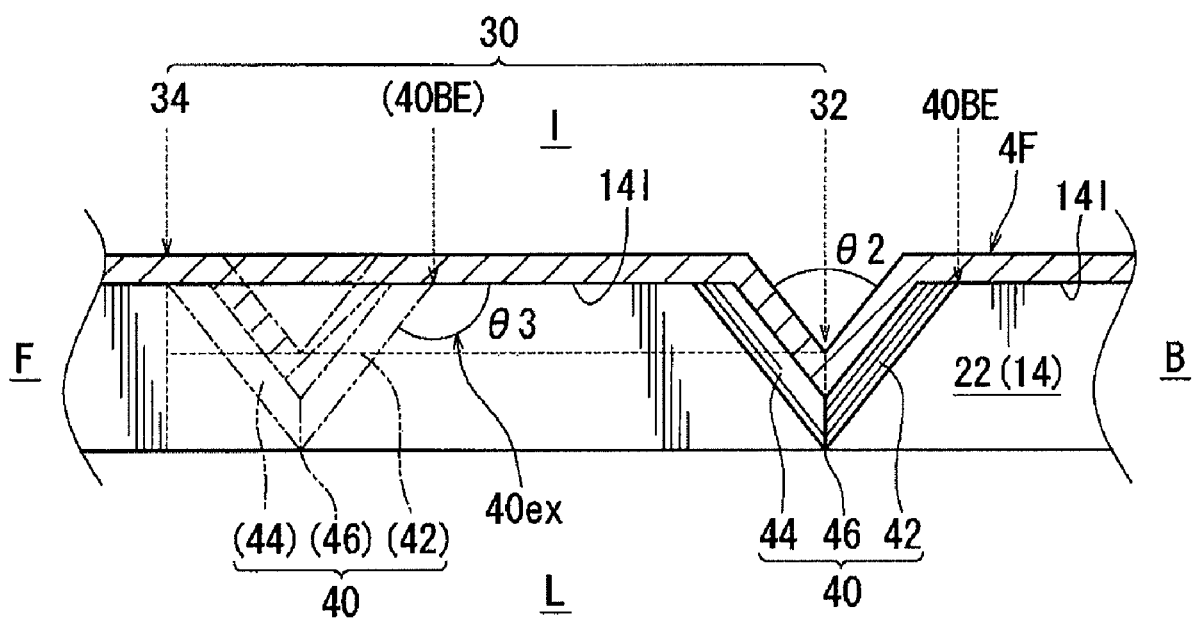
FIG. 6 is a lateral cross-sectional view taken along a line VI-VI in FIG. 4.

Referring to FIG. 5, the triangle bead 40 is formed by bending part of the side surface 14I outward (outwardly of the seat). In other words, the triangle bead 40 is a portion of the side surface 14I bulged outward (protruded portion), and is a portion where the bending of the side frame 14 starts.

The triangle bead 40 includes a pair of inclined surfaces 42, 44 and a center ridge 46 which partitions the pair of inclined surfaces 42, 44 (see FIG. 3 and FIG. 4). One apex of the triangle bead 40 is formed on a lower portion of the side surface 14I. Another apex of the triangle bead 40 is formed on the lower end flange 22. The center ridge 46 is a protruded portion extending substantially vertically in the top-and-bottom direction of the seat so as to connect the one apex and the other apex.

The pair of inclined surfaces 42, 44 is obliquely formed respectively from the center ridge 46 toward the side surface 14I. A terminal end of the inclined surface 42 (a bead rear end 40BE) is arranged on a rear side B of the seat. A terminal end of the inclined surface 44 (a bead front end 40FE) is arranged on a front side F of the seat.

At the time of the rear-end collision of the vehicle, the pair of side frames 14, 14 should be bent outward (outwardly of the seat) respectively by the triangle beads 40. Referring to FIG. 6, the pair of the side frames 14, 14 should be bent outward along the pair of inclined surfaces 42, 44 (at a bent angle θ2).

Assumed that the bead rear end 40BE (the terminal end of the inclined surface 42) is formed at the notched portion 30, such that the bead rear end 40BE is arranged towards the front side F with respect to the seat in relation to the rear end 32 of the notched portion 30 (see the portion indicated by a broken line in FIG. 6). At the bead rear end 40BE, the inclined surface 42 and the side surface 14I are in a state of bent inwardly of the seat at an angle θ3. In other words, the bead rear end 40BE is depressed with respect to the center ridge 46 (a depressed point 40ex is formed). In addition, the bead rear end 40BE (the depressed point 40ex) is arranged near the rear end 32 than to the center ridge 46. Therefore, the impact of the rear-end collision is transmitted first to the depressed point 40ex in the course of being transmitted from the rear end 32 to the front end 34. When the impact of the rear-end collision is transmitted to the depressed point 40ex, it serves as the starting point of bending, so that the side frame 14 might be bent. At this time, the side frame 14 has a risk of being bent inwardly at the angle θ3 by the depressed point 40ex.

Therefore, the bead rear end 40BE can be arranged on the back side B of the seat with respect to the rear end 32 (see the portion indicated by a solid line in FIG. 6). In other words, by not forming the depressed point 40ex in the notched portion 30, the side frames 14, 14 can be bent outwardly at positions where the notched portion 30 is formed. In this configuration, bending of the pair of side frames 14, 14 inwardly is prevented or reduced when a stress is applied to the notched portions 30. Specifically, the pair of side frames 14, 14 can be bent outward further reliably (at the bent angle θ2) with the triangle beads 40 (the center ridges 46) as the starting point of bending.

In addition, the center ridge 46 can be positioned right above the rear end 32 (the weakest portion) of the notched portion 30. The stress is concentrated to the rear ends 32 of the notched portions 30. Therefore, the side frames 14, 14 are respectively bent smoothly outwardly along the pair of inclined surfaces 42, 44 (at the bent angle θ2) from the center ridges 46 (see FIG. 2).

In this configuration the impact of the rear-end collision is effectively absorbed by the pair of side frames 14, 14 being bent outward (in the desired direction). Therefore, according to this embodiment, the reclining system 8 is protected from the impact of the rear-end collision further reliably. Then, by maintaining the seat-back 6 at the predetermined angle of inclination θ1 by the reclining system 8, the occupant during a rear-end collision is supported.

Further, in this configuration, the pair of side frames 14, 14 is bent outward so as to move the notched portions 30 away from each other. At the time of a rear-end collision, the width of a portion between the pair of side frames 14, 14 (the seating portion (S) of the occupant) is increased, so that the occupant is fitted into the widened seating portion (S). Therefore, the occupant is hardly moved out from the vehicle seat 2, so that the safety of the vehicle seat 2 at the time of a rear-end collision is improved.

ALTERNATIVE EMBODIMENTS

The frame structure of a vehicle seat of the embodiment is not limited to the previously described embodiments, and therefore it is possible to adopt various other embodiments.

(1) As described above, the notched portion 30 can be formed on the lower end flange 22. As an alternative configuration, the notched portion 30 can be formed on the upper end flange 20. The center ridge 46 can be arranged right below the upper end flange 20. In this configuration, the pair of side frames 14, 14 can be bent smoothly outwardly with the triangle beads 40.

The notched portions 30 and the triangle bead 40 can be formed both on the lower end flange 22 and the upper end flange 20.

(2) As described above, the center ridge 46 can be arranged right above the rear end 32 of the notched portion 30. As an alternative configuration, the bead rear end 40BE can be arranged on the back side B of the seat with respect to the rear end 32 of the notched portion 30. The center ridge 46 can be arranged on the front side F of the seat of the rear end 32 of the notched portion 30.

(3) The notched portion 30 and the triangle bead 40 can be provided only on one of the pair of side frames 14, 14.

(4) The position to form the notched portion 30 is not specifically limited. The notched portion 30 can be formed at a center position or a rear position of the side frame 14 in terms of the fore-and-aft direction of the seat.

The notched portions 30 of the pair of side frames 14, 14 can be formed at the same positions or different positions shifted in terms of the fore-and-aft direction of the seat.

As described above, the upper end flange 20 and the lower end flange 22 can be provided with the side frame 14 (the property of reinforcement of the side frame is enhanced). As an alternative configuration, the side frame 14 can be formed into a simple flat plate shape (a simple configuration).

The invention claimed is:

1. A vehicle seat comprising;
   a seat frame including a cushion frame, the cushion frame including a first and a second side frame;
   a bead extending from an outer side of at least one of the first and the second side frames; the bead including a first and a second inclined surface connected to each other at a ridge portion;
   a notch portion defined in a lower portion of the at least one of the first and second side frames and comprising a cut out, wherein the notch portion is positioned proximate the bead:
   wherein the first and second inclined surfaces extend from a longitudinally extending side surface of the at least one of the first and second side frames to a first wall that extends longitudinally transverse to the side surface;
   wherein the cut out is in a second wall that extends longitudinally transverse to first wall and is spaced from the side surface, the cut out having an edge in the front to rear direction, the edge of the cut out being substantially vertically aligned with one of the inclined surfaces of the bead in a vertical direction that is perpendicular to the front to rear direction of the vehicle seat.

2. The vehicle seat of claim 1, wherein the at least one of the first and second side frames includes an upper end flange and a lower end flange comprising the first wall, the upper end flange and the lower end flange connected by the side surface.

3. The vehicle seat of claim 1, wherein the ridge portion has a first and second end, further wherein the first end is positioned proximate a middle portion of the side surface and the second end is positioned proximate a corner portion between the first and second walls.

4. The vehicle seat of claim 1, wherein the cutout is in the second wall, the second wall extending substantially vertically.

5. The vehicle seat of claim 4, wherein the notch portion has a first side positioned toward a front of the at least one of the first and second side frames, and a second side positioned opposite the first side, wherein the second side extends proximate to the second end of the ridge portion.

6. The vehicle seat of claim 1, wherein the bead is substantially triangularly shaped.

7. The vehicle seat of claim 1, wherein the cut out has a substantial rectangular shape.

8. The vehicle seat of claim 1, wherein the bead extends from an outward end of a horizontal surface of the first wall of the at least one of the first and second side frames to a vertical surface of the side wall of the at least one of the first and second side frames.

9. The vehicle seat of claim 1, the bead comprising a generally pyramid-shaped protrusion extending from a vertically extending surface of the side wall.

10. The vehicle seat of claim 1, the at least one of the first and second side frames including surfaces substantially perpendicular to each other,
    the first and second inclined surfaces extending from one of the substantially perpendicular surfaces to the other of the substantially perpendicular surfaces.

11. The vehicle seat of claim 1, the cut out extends from an end surface of the at least one of the first and second side frames, one of the edges of the cut out extending substantially perpendicular to the end surface and an other of the edges of the cut out extending obliquely from the end surface.

12. The vehicle seat of claim 1, the bead and notch portion being configured such that upon being subjected to rear end collision, each of the first and second side frames will deform away from each other.

13. The vehicle seat of claim 1, a rear end of the bead is positioned closer to the back side of the seat frame than a rear end of the notch portion.

* * * * *